(12) United States Patent
Ogata et al.

(10) Patent No.: US 11,719,211 B2
(45) Date of Patent: Aug. 8, 2023

(54) VEHICLE ENGINE STARTING METHOD, SERIES HYBRID VEHICLE, AND VEHICLE ENGINE STARTING DEVICE

(71) Applicant: Nissan Motor Co., Ltd., Yokohama (JP)

(72) Inventors: Makoto Ogata, Kanagawa (JP);
Masayuki Ootani, Kanagawa (JP);
Yoshihiro Terai, Kanagawa (JP);
Tsukasa Ichiba, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/770,308

(22) PCT Filed: Nov. 8, 2019

(86) PCT No.: PCT/JP2019/043957
§ 371 (c)(1),
(2) Date: Apr. 20, 2022

(87) PCT Pub. No.: WO2021/090491
PCT Pub. Date: May 14, 2021

(65) Prior Publication Data
US 2022/0389896 A1     Dec. 8, 2022

(51) Int. Cl.
*F02N 11/00* (2006.01)
*F02N 11/08* (2006.01)
*F02P 5/15* (2006.01)

(52) U.S. Cl.
CPC ...... *F02N 11/0859* (2013.01); *F02N 11/0862* (2013.01); *F02P 5/15* (2013.01)

(58) Field of Classification Search
CPC .. F02N 11/0859; F02N 11/0862; F02N 11/04; F02P 5/15; F02P 5/1506;
(Continued)

(56) References Cited

U.S. PATENT DOCUMENTS

2009/0256513 A1* 10/2009 Ando ............... B60L 50/16
903/930
2009/0259391 A1* 10/2009 Ando ............... B60K 6/365
180/65.265
(Continued)

FOREIGN PATENT DOCUMENTS

EP          2 639 129 A1    9/2013
JP          5-146008 A      6/1993
(Continued)

*Primary Examiner* — Jacob M Amick
*Assistant Examiner* — Sherman D Manley
(74) *Attorney, Agent, or Firm* — Global IP Counselors, LLP (57) ABSTRACT

A engine starting method is carried out to start an engine of a vehicle. The vehicle includes a first hub, a second hub, and a damper. The damper connects the first hub and the second hub in a power transmission path between the engine and a generator capable of power generation and powered travel. The engine starting method determines whether or not the engine needs to be started, begins to crank the engine via the generator when the engine needs to be started, performs a first ignition when torque fluctuation caused by torsion in the first hub and the second hub is in a range of being absorbable by the damper during the cranking, and suppresses engine torque generated by the first ignition below engine torque generated by second and subsequent ignitions.

5 Claims, 8 Drawing Sheets

(58) Field of Classification Search
CPC ... F16F 15/1217; F16F 15/1238; F02D 29/06; B60K 6/442; B60K 6/46; B60W 30/20; B60W 2030/206; B60W 10/06; Y02T 10/62; Y02T 10/40

See application file for complete search history.

(56) References Cited

U.S. PATENT DOCUMENTS

| | | | |
|---|---|---|---|
| 2014/0162835 A1* | 6/2014 | Gotoda | B60W 20/10 |
| | | | 180/65.265 |
| 2016/0201729 A1* | 7/2016 | Uehara | F16F 15/12326 |
| | | | 464/68.92 |
| 2018/0134278 A1* | 5/2018 | Gotoda | B60W 20/50 |
| 2019/0210587 A1* | 7/2019 | Nishida | B60W 10/08 |
| 2019/0232949 A1* | 8/2019 | Takasu | B60K 6/22 |
| 2022/0389896 A1* | 12/2022 | Ogata | F02N 11/0859 |

FOREIGN PATENT DOCUMENTS

| | | |
|---|---|---|
| JP | 2016-118272 A | 6/2016 |
| JP | 2018-17212 A | 2/2018 |
| JP | 2019-182335 A | 10/2019 |
| WO | 2012/063299 A1 | 5/2012 |

\* cited by examiner

VEHICLE ENGINE STARTING METHOD, SERIES HYBRID VEHICLE, AND VEHICLE ENGINE STARTING DEVICE

CROSS-REFERENCE TO RELATED APPLICATIONS

This application is a U.S. national stage application of International Application No. PCT/JP2019/043957, filed on Nov. 8, 2019.

BACKGROUND

Technical Field

The present invention relates to control during the starting of an engine of a vehicle.

Background Information

JP 2018-17212 A discloses an engine starting method in which an engine is cranked using a generator capable of power generation and powered travel. In this document, to reduce gear rattle in a reducer disposed in a power transmission path between the generator and the engine when the engine is starting, the rotational speed of the generator during cranking is reduced after first being increased, and then a first ignition is performed.

SUMMARY

However, in the engine starting method of the abovementioned document, the time needed to perform the first ignition could yet be examined.

In addition, to suppressing transmission of torque fluctuation in the engine to the generator, providing a damper using a spring in the power transmission path between the generator and the engine is known. However, the abovementioned document does not disclose an engine starting method for a case in which a damper is provided.

In view of this, it is an object of the present invention to provide a method for starting an engine in a configuration provided with a damper, wherein the engine can be started quickly and gear rattle accompanying the engine starting can be suppressed.

According to an aspect of the present invention, there is provided a method for starting an engine of a vehicle comprising a first hub, a second hub, and a damper connecting the first hub and the second hub in a power transmission path between the engine and a generator capable of power generation and powered travel. The engine starting method assesses whether or not the engine needs to be started, begins to crank the engine via the generator when the engine needs to be started, performs a first ignition when torque fluctuation caused by torsion in the first hub and the second hub is in a range of being absorbable by the damper during the cranking, and suppresses engine torque generated by the first ignition below engine torque generated by second and subsequent ignitions.

BRIEF DESCRIPTION OF THE DRAWINGS

Referring now to the attached drawings which form a part of this original disclosure.

DETAILED DESCRIPTION OF EMBODIMENTS

An embodiment of the present invention is described below with reference to the drawings.

Figure 1:
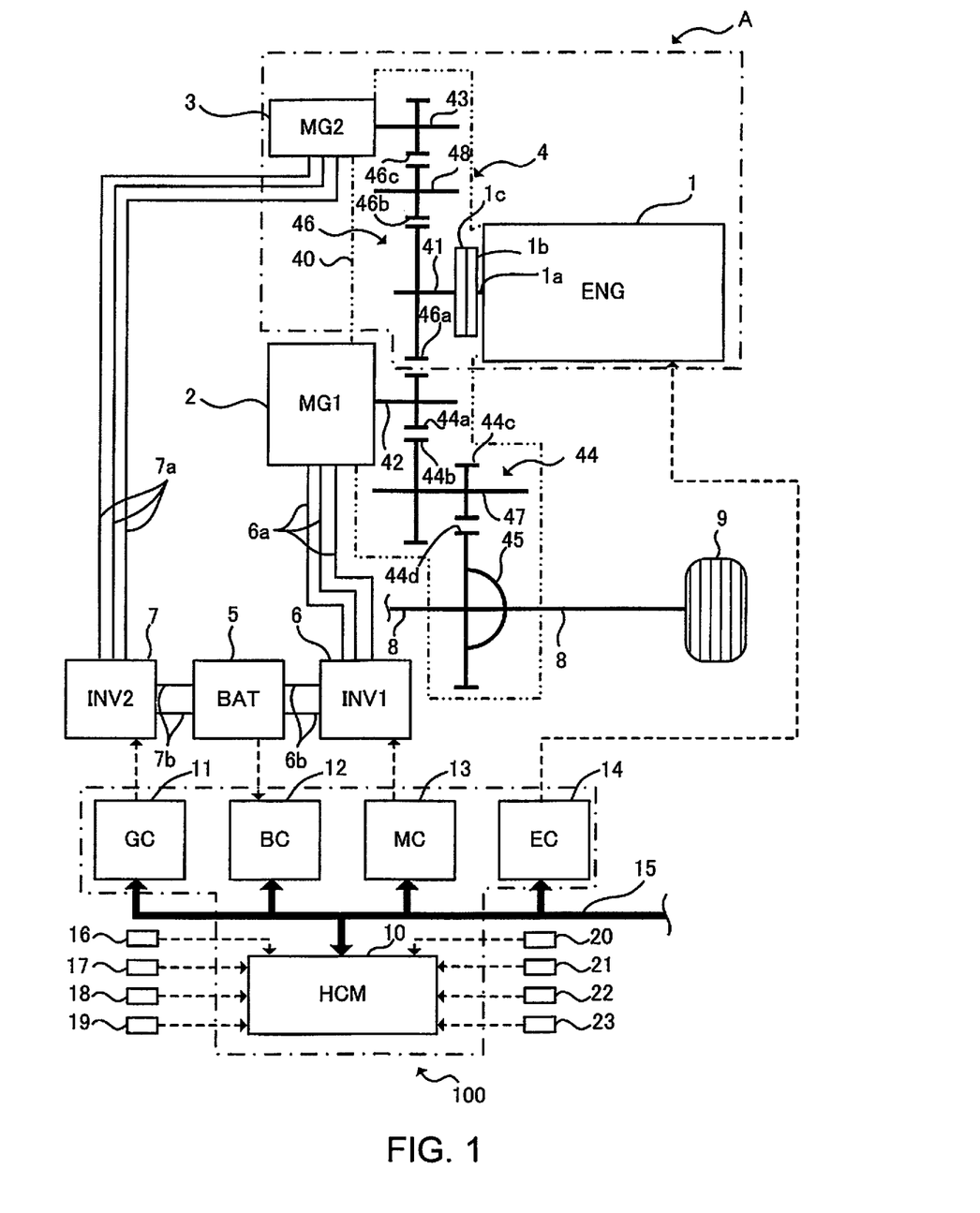
FIG. 1 is a schematic structural view of a drive system and a control system of a series hybrid vehicle.

FIG. 1 is a schematic structural view of a drive system and a control system of a series hybrid vehicle (also referred to below simply as a "vehicle") according to an embodiment of the present invention. While a charge rate of a battery is high, an engine is stopped and travel of the vehicle is powered by a for-travel electric motor, and when the charge rate of the battery decreases, a generator is driven by the engine and the travel of the vehicle is powered by the for-travel electric motor while power is being generated.

The drive system of the vehicle comprises an engine 1 (ENG), a first motor generator 2 (MG1), a second motor generator 3 (MG2), and a gear box 4, as shown in FIG. 1. The second motor generator 3 is equivalent to the generator of the present invention.

The engine 1 is, for example, a gasoline engine, a diesel engine, or the like under a front hood of the vehicle, where an axial direction of a crankshaft is a vehicle width direction. A body of the engine 1 is linked and secured to a gear case 40 of the gear box 4. A crankshaft 1a of the engine 1 is connected to an engine shaft 41 of the gear box 4 via a flywheel 1b and a damper 1c. The engine 1 is started with the second motor generator 3 as a starter motor.

The first motor generator 2 is a three-phase AC permanent magnet type synchronous motor for which the power source is a battery 5, which is installed as a travel drive source, and this motor generator also has a regeneration function during deceleration and braking. A stator case of the first motor generator 2 is linked and secured to the gear case 40 of the gear box 4. A first inverter 6, which converts direct current to three-phase alternating current during powered travel and converts three-phase alternating current to direct current during regeneration, is connected to a stator coil of the first motor generator 2 via first AC harnesses 6a. The first inverter 6 and the battery 5 are connected via first DC harnesses 6b.

The second motor generator 3 is a three-phase AC permanent magnet type synchronous motor for which the power source is the battery 5, which is installed as a generator, and this motor generator also has a function as a starter motor for the engine 1 and a motor-driven operation function. The stator case of the second motor generator 3 is linked and secured to the gear case 40 of the gear box 4. A rotor of the second motor generator 3 is connected to a second motor shaft 43 of the gear box 4. A second inverter 7, which converts direct current to three-phase alternating current during powered travel and converts three-phase alternating current to direct current during regeneration, is connected to the stator coil of the second motor generator 3 via second AC harnesses. The second inverter 7 and the battery 5 are connected via second DC harnesses 7b.

The gear box 4 is configured by placing a reduction gear train 44, a differential gear unit 45, and a gear train 46 in the gear case 40 in which the engine 1, the first motor generator 2, and the second motor generator 3 are linked and secured.

The reduction gear train 44 is a two-step reduction gear train that reduces the rotation of the first motor generator 2 and increases motor torque to ensure travel driving torque. A first reduction gear step is configured by meshing together a first motor gear 44a provided to a first motor shaft 42 and a large-diameter idler gear 44b provided to a first idler shaft 47. A second reduction gear is configured by meshing together a small-diameter idler gear 44c provided to the first idler shaft 47 and an output gear 44d provided on an input side of the differential gear unit 45.

The differential gear unit 45 transmits driving torque inputted via the output gear 44d of the reduction gear train 44 to left and right drive wheels 9, 9 (only one is shown in FIG. 1) via left and right drive shafts 8, 8 while allowing a rotation differential.

The gear train 46 is a gear train that directly links the engine 1 and the second motor generator 3 (generator) without a clutch interposed therebetween, and this gear train has the engine shaft 41, a second idler shaft 48, and the second motor shaft 43. The gear train 46 is configured by meshing together an engine gear 46a provided to the engine shaft 41, a second idler gear 46b provided to the second idler shaft 48, and a second motor gear 46c provided to the second motor shaft 43. There is a greater number of gear teeth in the engine gear 46a than in the second motor gear 46c, and during power-generating operation, the rotation speed of the engine 1 is increased and the engine required for power generation is transmitted to the second motor generator 3 by combustion operation (firing operation). During starter operation or a motor-driven operation, the rotation speed of the second motor generator 3 is reduced, and the motor torque required for starter operation or motor-driven operation is transmitted to the engine 1.

The control system for the vehicle comprises a hybrid control module 10 (HCM below), a power generation controller 11 (GC below), a battery controller 12 (BC below), a motor controller 13 (MC below), and an engine controller (EC below), as shown in FIG. 1.

The HCM 10 and the other controllers (the GC 11, the BC 12, the MC 13, the EC 14, etc.) are connected by a CAN communication line 15 so as to be capable of two-way information exchange. CAN is an abbreviation of "controller area network." In addition, the HCM 10 and the other controllers (the GC 11, the BC 12, the MC 13, the EC 14, etc.) are referred to collectively as a controller 100. The controller 100 is equivalent to the control unit of the present invention.

The HCM 10 is an integrated control means that has the function of appropriately managing energy consumption of the entire vehicle. Specifically, information on a battery charge rate (referred to below as the state of charge (SOC)) is read from the BC 12 via the CAN communication line 15. In addition, information is read from an accelerator position sensor 16, a vehicle speed sensor 17, an engine rotation speed sensor 18, an engine-cooling water temperature sensor 19, an outside air temperature sensor 20, a door switch 21, a bonnet switch 22, an ignition switch 23, etc. Various controls are performed on the basis of this information. Then, various controls are performed based on this information. Of these controls, control performed for the purpose of causing a series hybrid vehicle capable of external charging to travel with high fuel efficiency is control for selecting a travel mode (CD mode and CS mode described hereinafter) based on the SOC of the battery 55.

The CD in CD mode is an abbreviation of "charge depleting." CD mode is, as a general rule, a mode that prioritizes EV travel, which consumes the power of the battery 5; for example, CD mode is selected while the SOC of the battery 5 is decreasing from a full SOC to a set SOC.

The CS in CS mode is an abbreviation of "charge sustain." CS mode is, as a general rule, a mode that prioritizes travel in which the power of the battery 5 is maintained by the power-generating operation of the engine 1, and CS mode is selected when the SOC of the battery 5 becomes equal to or less than the set SOC. The set SOC, which is a mode-switching threshold value, has a hysteresis between the value at the time of switching from CD mode to CS mode and the value at the time of switching from CS mode to CD mode.

The GC 11 performs, inter alia, powered travel control and regeneration control for the first motor generator 2 in response to a torque control command and a rotation speed control command for the second inverter 7. The BC 12 manages, inter alia, the SOC and the temperature of the battery 5. The MC 13 performs, inter alia, powered travel control and regeneration control for the first motor generator 2 in response to a torque control command and a rotation speed control command for the first inverter 6. The EC 14 performs, inter alia, start control for the engine 1, stop control for the engine 1, and fuel cutoff control.

A power transmission path A (the section enclosed by single-dot lines in FIG. 1) between the engine 1 and the second motor generator 3 shall next be described.

Figure 2:
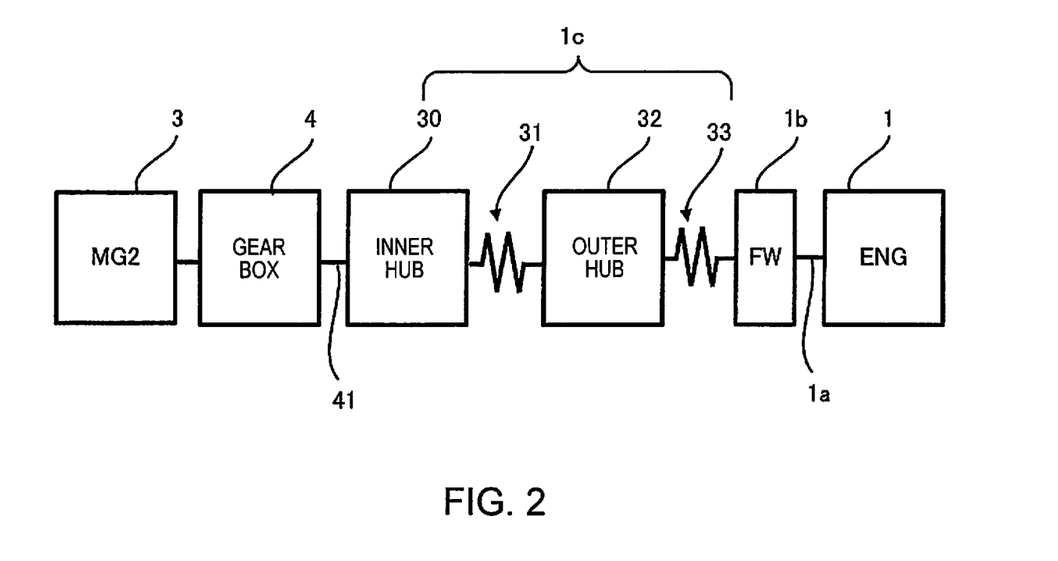
FIG. 2 is a schematic representation of a power transmission path between an engine and a second motor generator.

FIG. 2 is a schematic representation of the power transmission path A.

As described above, the flywheel 1b, the damper 1c, and the gear box 4 are disposed in the power transmission path A between the engine 1 and the first motor generator 2. The damper 1c is for minimizing torque fluctuation transmitted from the engine 1 to the second motor generator 3. Specifically, the damper 1c is configured from an inner hub 30 connected to the engine shaft 41 of the gear box 4, an outer hub 32 connected to the inner hub 30 via low-elasticity dampers 31, and high-elasticity dampers 33 connecting the outer hub 32 and the flywheel 1b. The low-elasticity dampers 31 and the high-elasticity dampers 33 are all springs, and the low-elasticity dampers 31 have a lower spring constant than the high-elasticity dampers 33. The inner hub 30 is equivalent to a first hub or first member of the present invention, the outer hub is equivalent to a second hub or second member of the present invention, and the low-elasticity dampers 31 are equivalent to a damper of the present invention.

Figure 3:
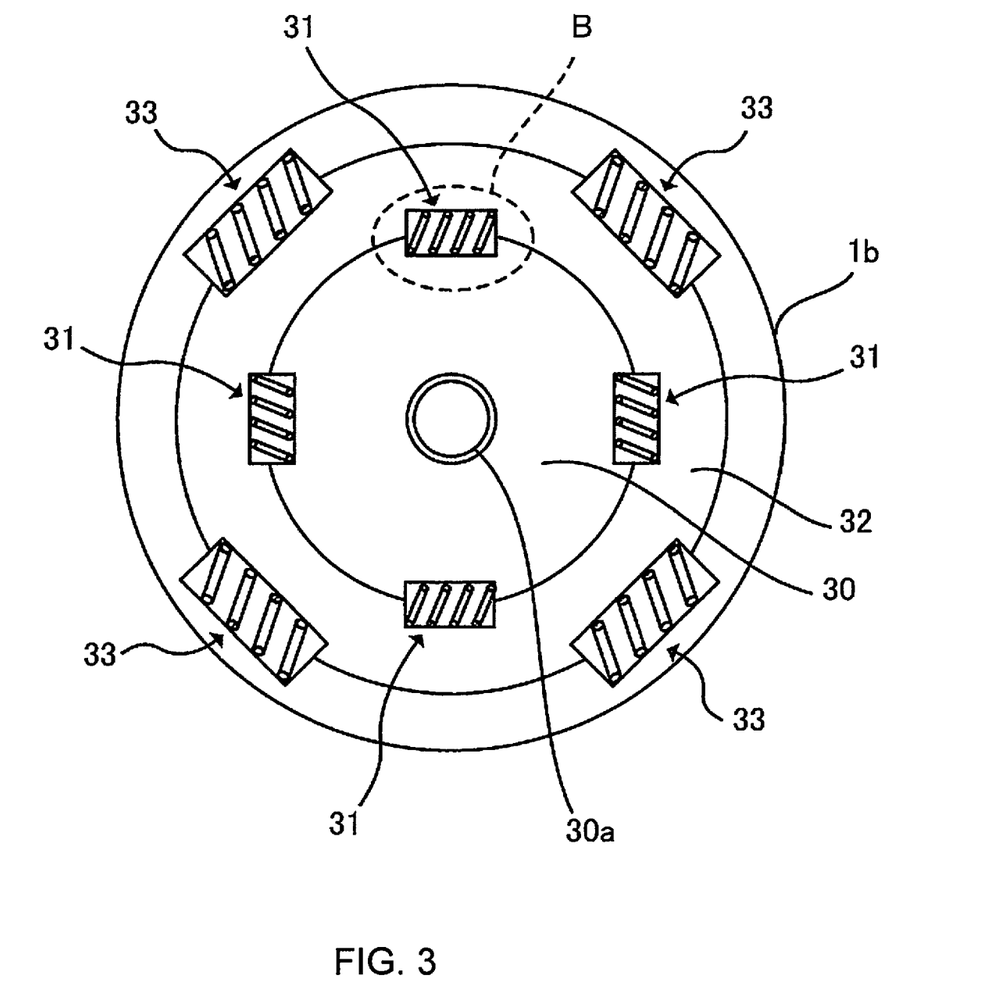
FIG. 3 shows an example of a damper.

One example of the damper 1c that can be used in the present embodiment is shown in FIG. 3. FIG. 3 is a front view of the damper 1c.

The inner hub 30 has a hole 30a in a center through which the engine shaft 41 is inserted, and has a cutaway part in an outer periphery. The outer hub 32 has a cutaway part in an inner periphery, in a position facing the cutaway part of the inner hub. The low-elasticity dampers 31 are extensibly disposed at a position defined by the cutaway part of the inner hub 30 and the cutaway part of the outer hub 32. There are four low-elasticity dampers 31 in the present embodiment, but this number is not provided by way of limitation; for example, there may be two or three.

The outer hub 32 also has a cutaway part in the outer periphery. The flywheel 1b has a cutaway part in an inner periphery, in a position facing the cutaway part in the outer periphery of the outer hub 32. The high-elasticity dampers 33 are extensibly disposed at a position defined by the cutaway part in the outer periphery of the outer hub 32 and the cutaway part of the flywheel 1b. There are four high-elasticity dampers 33 in the present embodiment, but this number is not provided by way of limitation; for example, there may be two or three.

Figure 4:
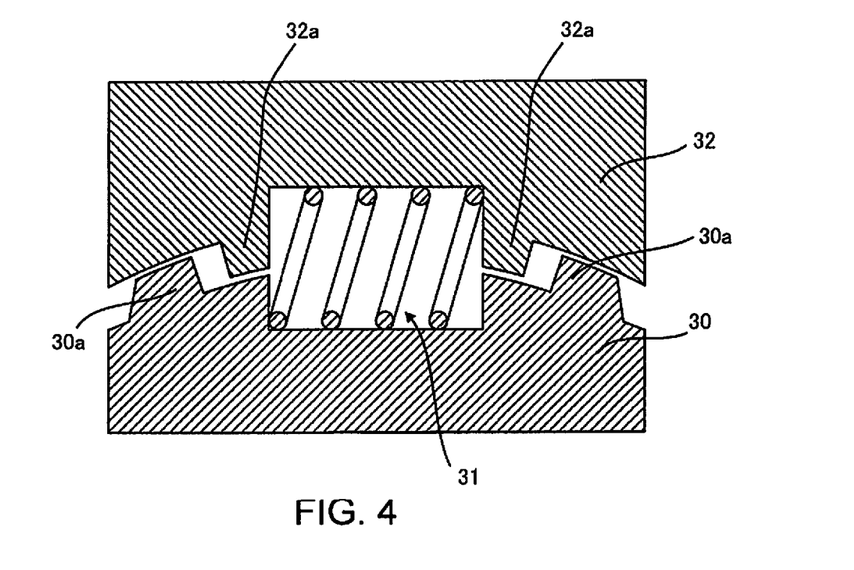
FIG. 4 is an enlarged view of area B in FIG. 3, showing a state in which an inner hub and an outer hub are not in contact with each other.
Figure 5:
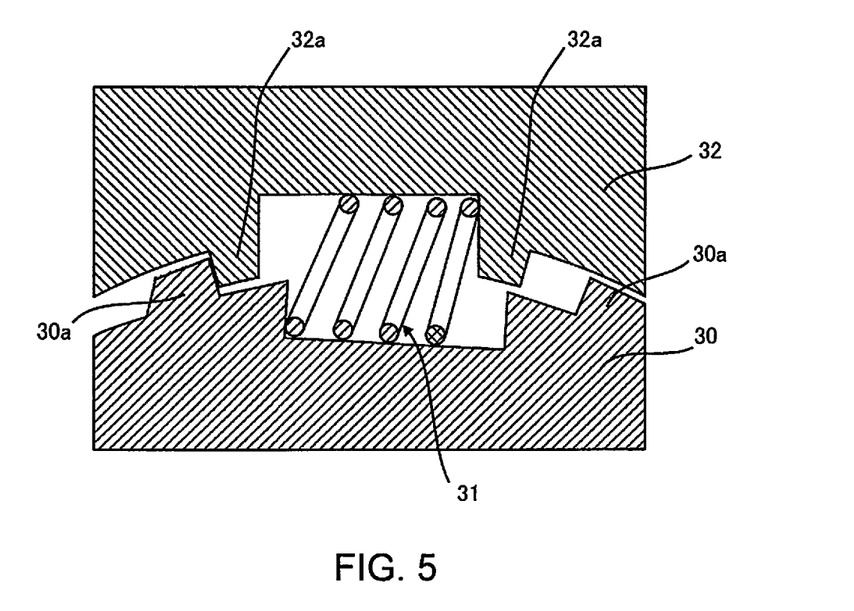
FIG. 5 is an enlarged view of area B in FIG. 3, showing a state in which an inner hub and an outer hub are in contact with each other.

FIGS. 4 and 5 are enlarged views of the section closed by the dashed line B in FIG. 3. FIG. 4 shows a state in which there is no torsion in the inner hub 30 and the outer hub 32, and FIG. 5 shows a state in which the inner hub 30 and the outer hub 32 are in contact with each other.

Though not shown in FIG. 3, a protrusion 30a is provided on the outer periphery of the inner hub 30, and a protrusion 32a is provided on the inner periphery of the outer hub 32. When there is no torsion in the inner hub 30 and the outer hub 32, there is a predetermined gap in the circumferential direction between the protrusion 30a and the protrusion 32a as shown in FIG. 4. When there is torsion in the inner hub 30 and the outer hub 32, the protrusion 30a and the protrusion 32a rotate relative to each other, and the low-elasticity dampers 31 contract. Torque fluctuation can be absorbed by the low-elasticity dampers 31 until the protrusion 30a and the protrusion 32a come into contact with each other as shown in FIG. 5.

A relationship between the outer hub 32, the flywheel 1b, and the high-elasticity dampers 33 is the same as a relationship between the inner hub 30, the outer hub 32, and the low-elasticity dampers 31 described above. When the torque fluctuation becomes too large to be absorbed by the low-elasticity dampers 31, the high-elasticity dampers 33 expand and contract to absorb the torque fluctuation.

Figure 6:
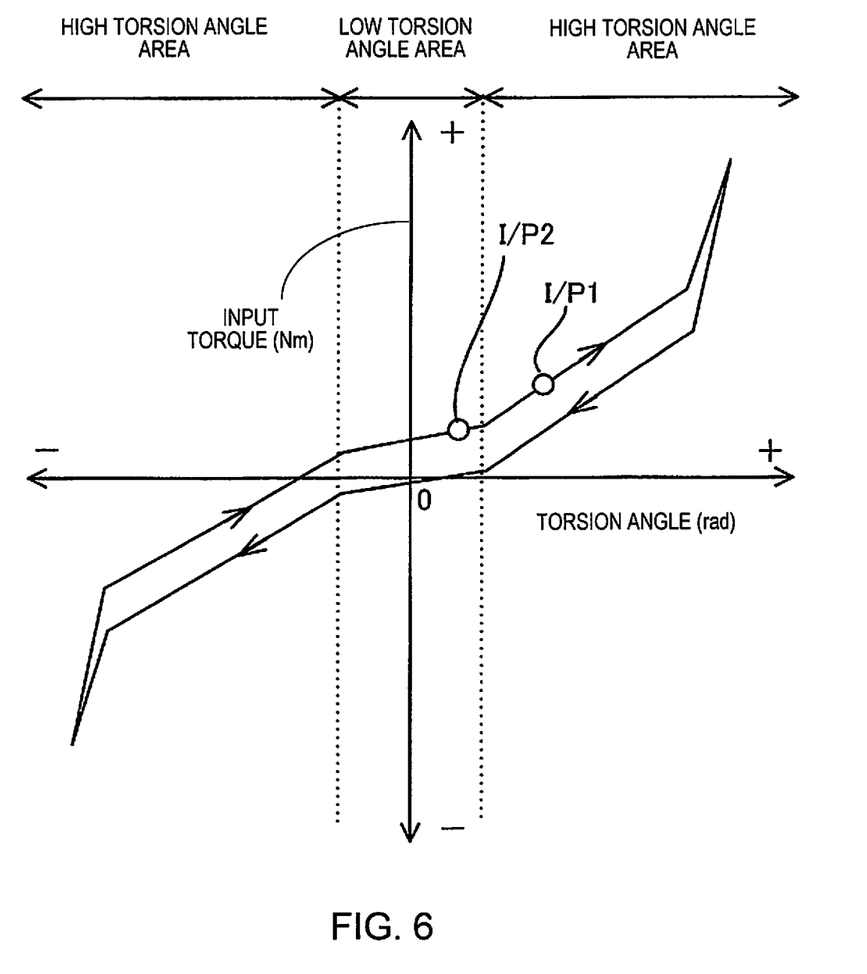
FIG. 6 shows a relationship between input torque and torsion angle.

A relationship between torsion angle and torque inputted to the damper 1c is as shown in, for example, FIG. 6 due to the action of the low-elasticity dampers 31 and the high-elasticity dampers 33. In this embodiment, a torsion angle area in which the torque fluctuation can be absorbed by the low-elasticity dampers 31 is a low torsion angle area, and a torsion angle area in which the torque fluctuation can be absorbed by the high-elasticity dampers 33 is a high torsion angle area. As for input torque being positive or negative, input torque from the engine 1 is positive and input torque from the second motor generator 3 is negative.

The low torsion angle area is equivalent to a "range in which torque fluctuation caused by torsion in the first hub and the second hub can be absorbed by the damper" in the present invention. Points I/P1 and I/P2 in FIG. 6 shall be described hereinafter.

Due to the configuration described above, torque fluctuation is absorbed by the low-elasticity dampers 31 when the torque of the engine 1 is small, and torque fluctuation is absorbed by the high-elasticity dampers 33 when the torque of the engine 1 is large. In other words, fluctuation in the torque of the engine 1 can be absorbed in a wide engine operation range due to the low-elasticity dampers 31 and the high-elasticity dampers 33 being provided.

Control for starting the engine 1 in order to generate power shall next be described.

When the engine 1, the engine 1 is cranked by the second motor generator 3, and a first ignition is performed when a predetermined engine rotation speed is reached. When an initial explosion occurs and the engine 1 generates torque, the engine 1 will drive the second motor generator 3. The term "first ignition" means an initial ignition in the cylinders in the case of a multicylinder engine.

When the engine is started, the engine 1, which does not generate torque during cranking, will abruptly generate torque due to the initial explosion. When the initial explosion is performed while the torque is in the low torsion angle area and the torque then transitions to the high torsion angle, the inner hub 30 and the outer hub 32 collide and "gear rattle" occurs. If such a collision is repeated every time the engine starts, the inner hub 30 and the outer hub 32 become progressively worn. The collision mentioned here is a collision between the protrusion 30a of the inner hub 30 and the protrusion 32a of the outer hub 32 as shown in FIG. 5.

Performing a first ignition after reaching a high torsion angle area through cranking is known as a method for minimizing the occurrence of the above-described gear rattle and wear of the inner hub 30 and outer hub 32. An example of this method is shown in FIG. 7 as a reference example.

Figure 7:
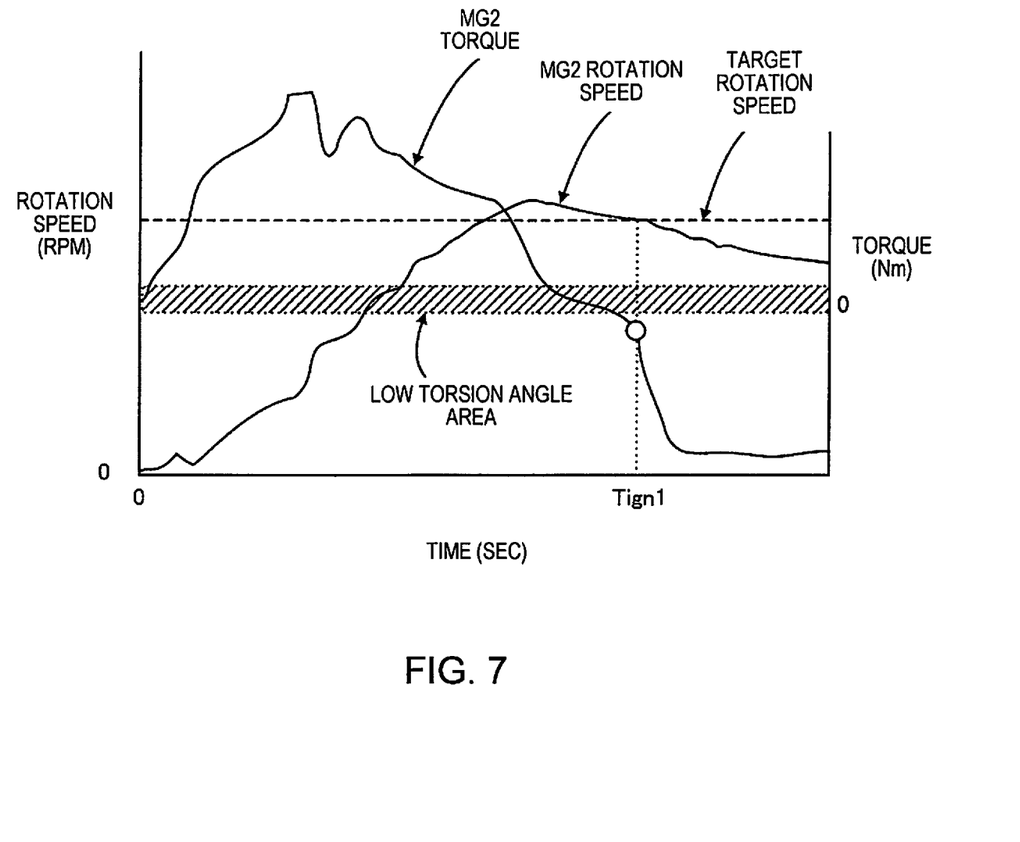
FIG. 7, as a comparative example, is a timing chart of when the engine is started after a high torsion angle area is entered.

As shown in FIG. 7, when an engine start request is generated at timing 0, the torque of the second motor generator 3 (referred to below also as MG2 torque) increases, and the rotation speed of the second motor generator 3 (referred to below also as MG2 rotation speed) thereby increases. The MG2 rotation speed in this embodiment is converted to rotation speed of the engine shaft 41 on the basis of a reduction ratio of the gear box 4. Therefore, the MG2 rotation speed can be regarded to be the same as the rotation speed of the engine 1. The torque area containing diagonal lines in FIG. 7 is a low torsion angle area, and other areas are high torsion angle areas.

When the MG2 rotation speed approaches a target rotation speed for the first ignition, the MG2 torque begins to decrease in order to suppress the increase rate of the MG2 rotation speed. The target rotation speed for the first ignition in this embodiment is the rotation speed of the second motor generator 3 equivalent to a target engine rotation speed for starting the engine, i.e., the engine rotation speed at which the engine 1 can be started. Once the MG2 rotation speed has exceeded the target rotation speed, the MG2 rotation speed then begins to decrease, and the first ignition is performed at a timing Tign1 at which the MG2 torque transitions from the low torsion angle area to the high torsion angle area. The torsion angle and the input torque at the timing Tign1 is I/P1 in FIG. 6.

Due to the MG2 rotation speed being lowered once the MG2 rotation speed has been raised above the target rotation speed, the state of the inner hub 30 pushing the outer hub 32 up until then is changed to a state of the outer hub 32 pushing the inner hub 30 during the lowering of the rotation speed. When the initial explosion occurs, the second motor generator 3 is driven by the torque of the engine 1, and the outer hub 32 therefore pushes the inner hub 30. In other words, according to the engine start control of the reference example, the outer hub 32 comes to push the inner hub 30 when the first ignition is performed, and the inner hub 30 and the outer hub 32 therefore do not collide even if the engine torque caused by the initial explosion is inputted. Because there is no collision, there is no gear rattle, and wear can also be suppressed.

However, in the engine starting method of the reference example, even if the MG2 rotation speed has reached the target rotation speed, i.e., the engine 1 could be started if an ignition is performed, it is necessary to wait until the high torsion angle area is reached. Therefore, there is room for improvement in the engine starting method of the reference example from the viewpoint of shortening the engine starting time. Particularly, when the electric power that can be supplied by the battery 5 in a series hybrid vehicle is less than the power needed for the maximum acceleration of the vehicle, the engine 1 must be started and electric power must be supplied from the battery 5 and the second motor generator 3 to the first motor generator 2 during maximum acceleration; therefore, prompt engine starting is desired. Maximum acceleration refers to acceleration under high load conditions, such as merging into a main lane on a highway or acceleration for overtaking during high-speed travel.

In the present embodiment, the engine start control described below is executed in order to shorten the engine start time while minimizing gear rattle and wear due to the collision between the inner hub 30 and the outer hub 32. In addition, the vehicle to which the present embodiment is applied is a series hybrid vehicle in which the electric power that can be supplied by the battery 5 is less than the electric power required at the time of maximum acceleration of the vehicle.

In the present embodiment, when the MG2 rotation speed reaches the target rotation speed for the first ignition, or in other words, when the engine rotation speed reaches the target rotation speed for starting the engine, the first ignition is performed. The torsion angle and input torque at this time are at the point I/P2 in FIG. 6. The time required to start the engine can thereby be shortened as compared with the reference example.

Simply advancing the first ignition timing causes problems such as the above-described gear rattle and wear. Therefore, in the present embodiment, the engine torque generated by the first ignition is suppressed below the engine torque generated by the second and subsequent ignitions. The term "second and subsequent ignitions" means the second and subsequent ignitions in the cylinders in the case of a multi-cylinder engine.

As a result, it is possible to soften the collision between the inner hub 30 and the outer hub 32 when the torque due to the initial explosion is inputted, and to reduce the above-described gear rattle and wear.

A specific control routine for engine start control according to the present embodiment shall next be described.

Figure 8:
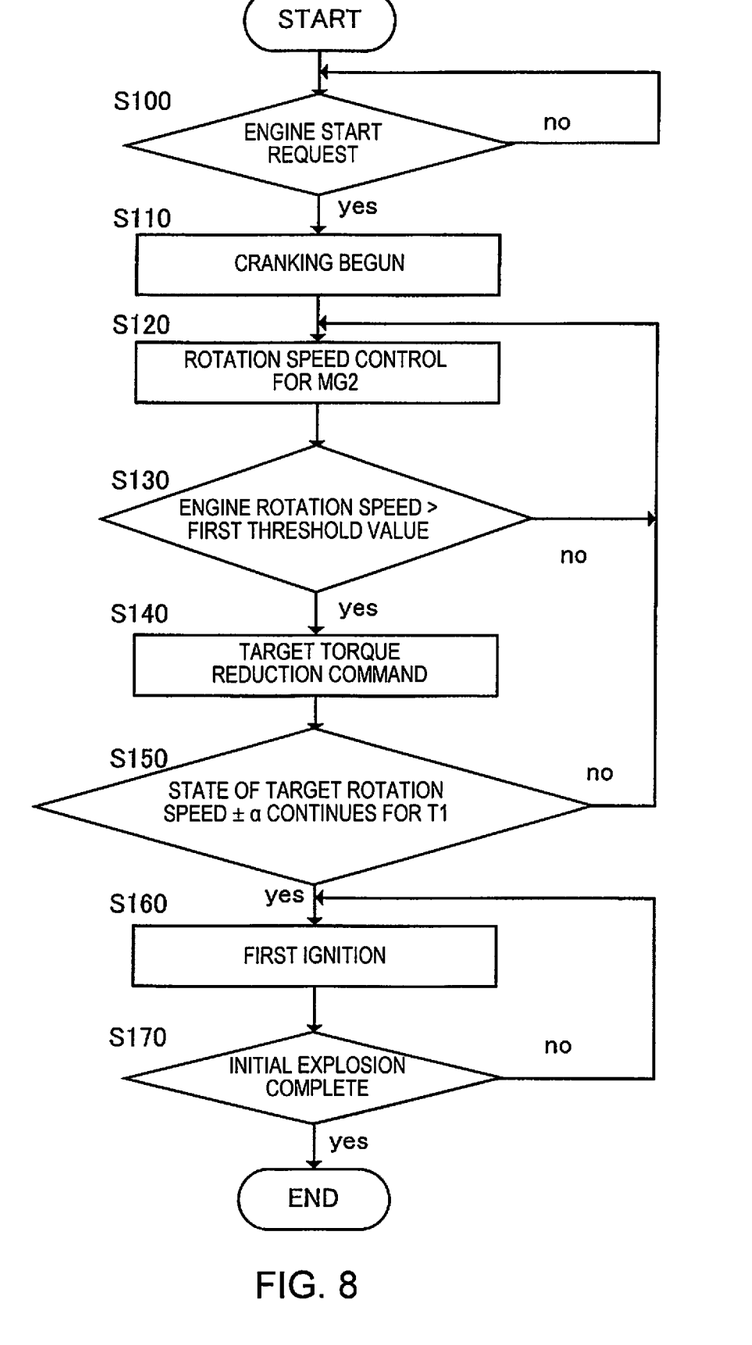
FIG. 8 is a flowchart of a control routine for engine start control according to an embodiment of the present invention.

FIG. 8 is a flowchart of the control routine for engine start control executed by the controller 100. The present control routine is programmed into the controller 100.

In step S100, the controller 100 determines whether or not there is an engine start request, executes the process of step S110 when there is an engine start request, and repeats the process of the present step when there is not. There is determined to be an engine start request in cases such as when the SOC of the battery 5 has decreased to the set SOC, or when the vehicle accelerates, requiring more electric power than what can be supplied by the battery 5.

In step S110, the controller 100 instructs the second motor generator 3 to begin cranking.

In step S120, the controller 100 controls the rotation speed of the second motor generator 3. Specifically, a profile of the engine rotation speed up to the target engine rotation speed for starting the engine is set, and the rotation speed of the second motor generator 3 is controlled according to the rotation speed profile of the second motor generator 3 for realizing the engine rotation speed profile. The target engine rotation speed for starting the engine and the profile up to the target engine rotation speed are set in accordance with the specifications of the engine to which this control is applied.

In step S130, the controller 100 determines whether or not the engine rotation speed has exceeded a first threshold value. When the result of the determination is affirmative, the process of step S140 is executed, and when the result is negative, the process returns to step S120. The process of step S130 is to issue a target torque reduction command (described hereinafter) before the engine rotation speed reaches the target engine rotation speed. Therefore, the first threshold value is, for example, a rotation speed that is about several hundred rotations lower than the target engine rotation speed for starting the engine.

In step S140, the controller 100 issues a target torque reduction command. The target torque reduction command is a command to reduce the target torque for the first ignition, and the second and subsequent ignitions use the target torque of normal control. As a result, the target engine torque in the first ignition is reduced below the target engine torque in the second and subsequent ignitions, and the engine torque actually generated is also reduced by being controlled according to the target engine torque after the reduction. The reduction amount is set according to the specifications of the engine to which this control is applied. For example, because the wear characteristics of the inner hub 30 and the outer hub 32 differ depending on the material, the engine torque that can satisfy the durability performance is specified in advance by experiments, etc., in accordance with the wear characteristics of the inner hub 30 and the outer hub 32, and the reduction amount is set on the basis of this engine torque.

In step S150, the controller 100 determines whether or not the state in which the engine rotation speed is near the target engine rotation speed has continued for a preset time t1. When the result of the determination is affirmative, the process of step S160 is executed, and when the result is negative, the process returns to step S120. Step 150 is for appropriately determining whether or not the engine rotation speed has reached the target engine rotation speed. The value for the determination is not "the target engine rotation speed" but "the state of being near the target engine rotation speed" because the fact that the engine rotation speed also fluctuates slightly due to the torque fluctuation of the engine 1 is also taken into consideration. In other words, "the state of being near the target engine rotation speed" is a state in which the engine rotation speed is within a range of about several tens [rpm] centered on the target engine rotation speed. The time t1 is set as the continuation time in order to avoid erroneous assessments due to noise, etc.

In step S160, the controller 100 performs the first ignition.

In step S170, the controller 100 determines whether or not the initial explosion is complete, ends the present routine if so, and returns to the process of step S160 if not. The initial explosion is determined to be complete when, for example, the state of the torque of the second motor generator 3 being less than a torque threshold value continues for a time t2. The torque threshold value in this case is, for example, a value that causes the engine torque resulting from the first ignition to be a negative value. In other words, the engine 1 begins to operate autonomously, and it is determined whether or not the engine torque is transmitted to the second motor generator 3. The time t2 is set as the continuation time in order to avoid erroneous assessments due to noise, etc.

The actually generated engine torque is reduced by reducing the target engine torque in step S140, but another method may be used as long as the actually generated engine torque can be reduced. For example, a command to retard the ignition timing without changing the target engine torque may be issued. In the case of a multi-cylinder engine, depending on the specifications of the vehicle, it may not be possible to identify the cylinder to be ignited first and to retard only a specific cylinder at the time of starting. In this case, the first ignition timing of each cylinder is retarded, and the ignition timing under normal control is resumed in and after the next cycle.

In addition, in the present embodiment, it is presumed that the elastic modulus of the low-elasticity dampers 31 is set so that the torsion angle is in the low torsion angle area when the engine rotation speed is near the target engine rotation speed due to cranking.

Figure 9:
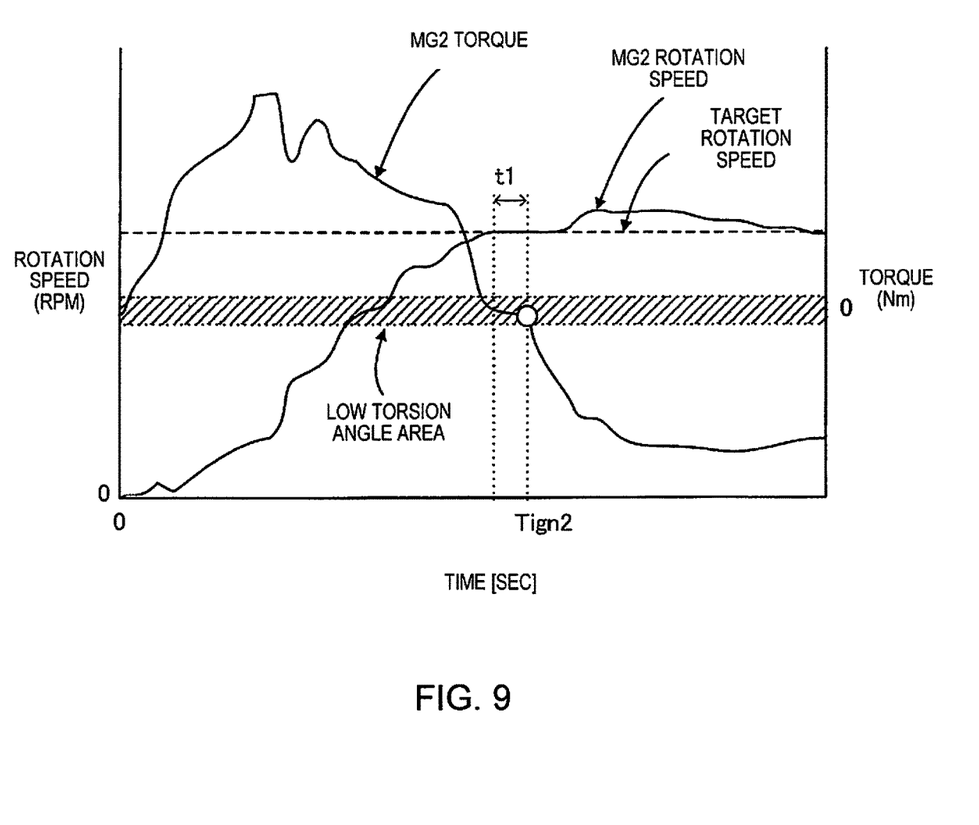
FIG. 9 is a timing chart of when the engine start control of FIG. 8 is executed.

FIG. 9 is a timing chart of when the engine start control according to the present embodiment is executed. As described above, the MG2 rotation speed can be regarded to be the same as the engine rotation speed. As shown in the drawings, the first ignition is performed at a timing Tign2 at which the time t1 elapses after the MG2 rotation speed comes to be near the target rotation speed. At this time, the MG2 torque is of such magnitude that the torsion angle is within the low torsion angle area. After ignition at the timing Tign2, the MG2 torque decreases due to input of the torque resulting from the initial explosion of the engine 1, but the engine torque resulting from the first ignition is suppressed, the minimization is stopped in the second and subsequent ignitions, and torque is therefore reduced in two stages as shown in FIG. 9. The reduction amount of the first stage is less than the reduction amount after the first ignition in the reference example of FIG. 7.

According to the present embodiment as described above, there is provided a method for starting an engine of a vehicle comprising an inner hub 30 (first hub), an outer hub (second hub), and low-elasticity dampers 31 (damper) connecting the inner hub 30 and the outer hub 32 in a power transmission path A between a second motor generator 3 (generator) and an engine 1. This engine starting method assesses whether or not the engine 1 needs to be started, and begins to crank the engine 1 via the second motor generator 3 when the engine 1 needs to be started. A first ignition is then performed when torque fluctuation caused by torsion in the inner hub 30 and the outer hub 32 is in a range of being absorbable by the damper during cranking, i.e., when the torsion angle is in a low torsion angle area, and the engine torque generated by the first ignition is suppressed below the engine torque generated by the second and subsequent ignitions. When an initial explosion occurs while the torsion angle is in the low torsion angle area, the engine torque causes the inner hub 30 and the outer hub 32 to collide, but in the present embodiment, gear rattle and wear can be reduced because the engine torque generated by the first ignition is suppressed below the engine torque generated by the second and subsequent ignitions. In addition, the initial explosion in the engine 1 is caused before a transition from the low torsion angle area to the high torsion angle area, and the time required for the engine to start can therefore be reduced as compared with performing the first ignition after the transition to the high torsion angle area.

In the present embodiment, the engine torque generated by the first ignition is suppressed by setting the target engine torque during the first ignition to be less than the target engine torque during the second and subsequent ignitions. This feature makes it possible to suppress the engine torque resulting from the first ignition.

In the present embodiment, the engine torque generated by the first ignition may be suppressed by having the ignition timing during the first ignition be later than the ignition timing during the second and subsequent ignitions. This feature also makes it possible to suppress the engine torque resulting from the first ignition.

The engine starting method of the present embodiment can be applied to a series hybrid vehicle in which electric power that can be supplied by a battery is less than electric power required for maximum acceleration of the vehicle. In such a series hybrid vehicle, the engine 1 must be started to perform power generation when maximum acceleration force is needed, as in the case of, for example, acceleration on a high-speed road. Therefore, acceleration performance of the vehicle improves when the time required to start the engine is shortened by the engine starting method of the present embodiment.

In a structure in which there is a coupling point (e.g., a spline fitting, etc.) with backlash in the power transmission path between the generator and the engine and gear rattle occurs when the engaging parts of two members come into contact with each other, the first ignition may be performed when the engaging parts of the two members are in a range of not being in contact with each other during cranking, and the engine torque generated by the first ignition may be suppressed below the engine torque generated by the second and subsequent ignitions.

An embodiment of the present invention was described above, but this embodiment merely presents part of an example to which the present invention is applied, and the technical scope of the present invention is not meant to be limited to the specific configuration of the above embodiment.

The invention claimed is:

1. A vehicle engine starting method for a vehicle including in an engine, a generator, a first hub, a second hub, and a spring connecting the first hub and the second hub in a power transmission path between the engine and the generator, the generator being configured to generate electric power and to drive powered travel of the vehicle, the engine starting method comprising:
   determining whether or not the engine needs to be started;
   cranking the engine by the generator upon determining the engine needs to be started;
   performing a first ignition of the engine upon determining that the engine has reached a target rotation speed; and
   controlling the first ignition such that an engine torque generated by the first ignition is below a target engine torque that is to be used in a second ignition and subsequent ignitions,
   the target rotational speed being a rotational speed at which a torsion angle between the first hub and the second hub is in a low torsion angle area, the low torsion angle area being a range in which the first hub and the second hub have not collided with each other and torque fluctuation caused by torsion occurring between the first hub and the second hub is absorbable by the spring during the cranking.

2. The vehicle engine starting method according to claim 1, wherein
   the controlling the first ignition includes setting a target engine torque for when the first ignition is performed to be lower than the target engine torque to be used in the second ignition and subsequent ignitions, so that the engine torque generated by the first ignition is smaller than an engine torque generated by the second ignition and subsequent ignitions.

3. The vehicle engine starting method according to claim 1, wherein the controlling the first ignition includes setting an ignition timing during the first ignition be later than an ignition timing during the second ignition and subsequent ignitions.

4. A series hybrid vehicle configured to carry out the vehicle engine starting method according to claim 1, wherein
electric power supplied by a battery is less than electric power required for maximum acceleration of the vehicle.

5. A vehicle engine starting device comprising:
a generator configured to generate power and powered travel;
an engine connected to the generator via a power transmission path;
a first hub and second hub disposed in the power transmission path;
a spring connecting the first hub and the second hub; and
a control unit configured to control the generator and the engine, wherein
the control unit is programmed to
determine whether or not the engine needs to be started;
crank the engine by the generator upon determining the engine needs to be started;
perform a first ignition upon determining that the engine has reached a target rotation speed, the target rotational speed being a rotational speed at which a torsion angle between the first hub and the second hub is in a low torsion angle area, the low torsion angle area being a range in which the first hub and the second hub have not collided with each other and torque fluctuation caused by torsion occurring between the first hub and the second hub is absorbable by the spring during the cranking; and
the first ignition being controlled such that an engine torque generated by the first ignition is below a target engine torque to be used in a second ignition and subsequent ignitions.

\* \* \* \* \*